Jan. 13, 1959  R. K. PEDERSEN  2,868,248
PORTABLE RECIPROCATING POWER SAW
Filed July 9, 1956  2 Sheets-Sheet 1
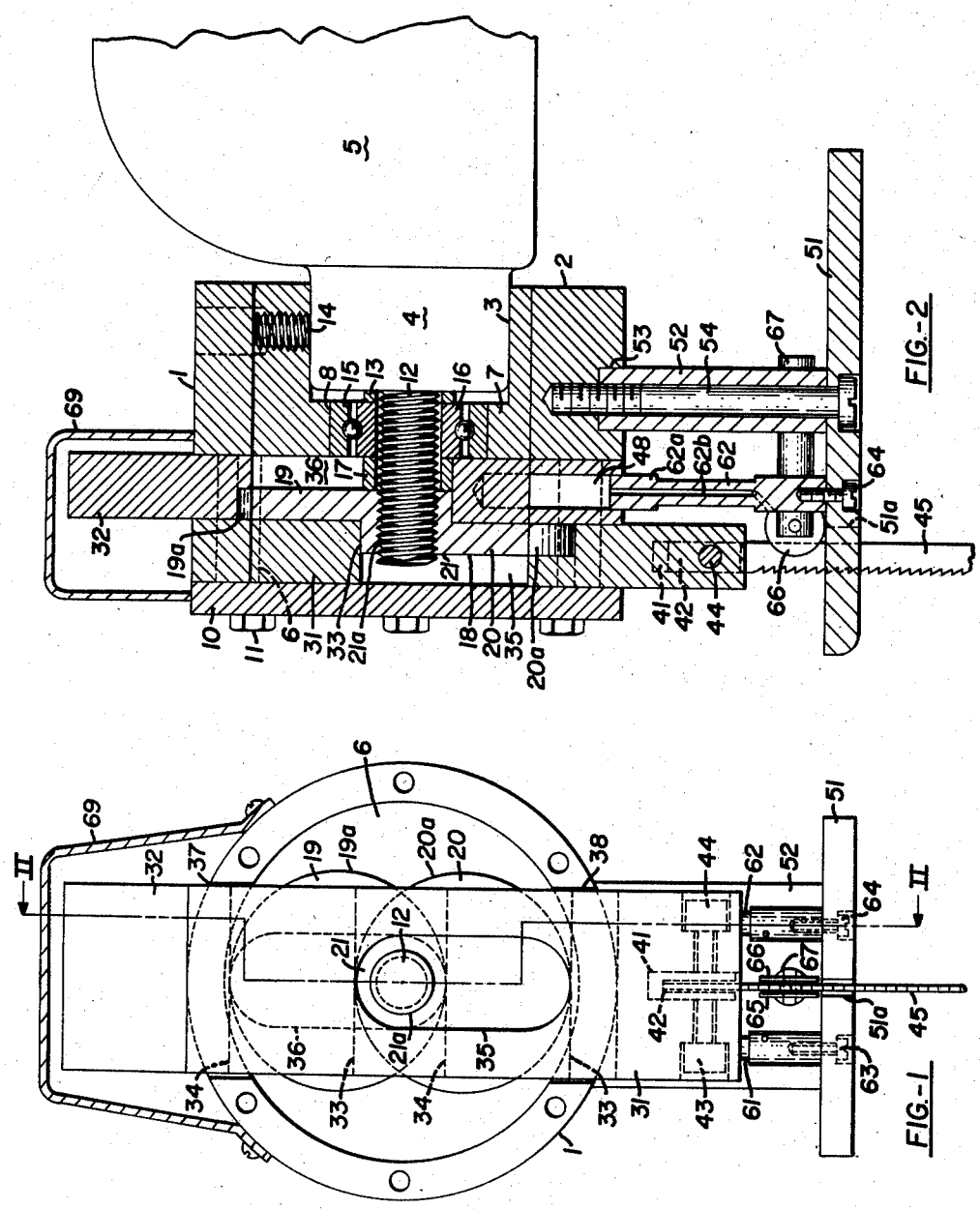
Ragnar K. Pedersen  Inventor
By  Attorney

2,868,248
PORTABLE RECIPROCATING POWER SAW
Ragnar K. Pedersen, Plainfield, N. J.
Application July 9, 1956, Serial No. 596,569
1 Claim. (Cl. 143—68)

The present invention relates to an apparatus for converting rotary motion into reciprocal motion at right angles to the axis of such rotary motion. More specifically the present invention relates to a device for producing reciprocal motion, including a rotatable cam structure, and the combination therewith of a pair of reciprocal slides driven by rotation of such cam to produce reciprocal motion at right angles to the axis of rotation of said cam. The invention further relates to a portable jig saw utilizing the rotatable cam and reciprocal slide means according to the present invention.

It is an object of the invention to provide a motion conversion means in which the operating elements may be balanced without complicated counterweights, or other similar balancing means. It is also an object of the invention to provide a cam structure and a reciprocal slide assembly each of which may be made substantially self balancing. It is a further object of the invention to provide a jig saw device in which the cam structure and slide assembly are cooperatively employed to produce a simple, close coupled, saw blade drive which may be combined with separate, motor operated, driving means, or integrated in a substantially unitary motor and drive housing.

The invention and its objects may be more fully understood from the following description, when it is read in conjunction with the accompanying drawings, in which:

Fig. 1 is a view in front elevation of a device according to the present invention, with the front cover plate therefor removed, to provide an internal view of the device, and with a portion of a protective cover for portions of the device extensible therefrom shown in vertical section;

Fig. 2 is a view in vertical section taken along the line II—II of Fig. 1, with some parts shown in elevation, and wherein the device is shown in attachment with an electric drill casing and shaft of which only portions are shown.

Figure 3:
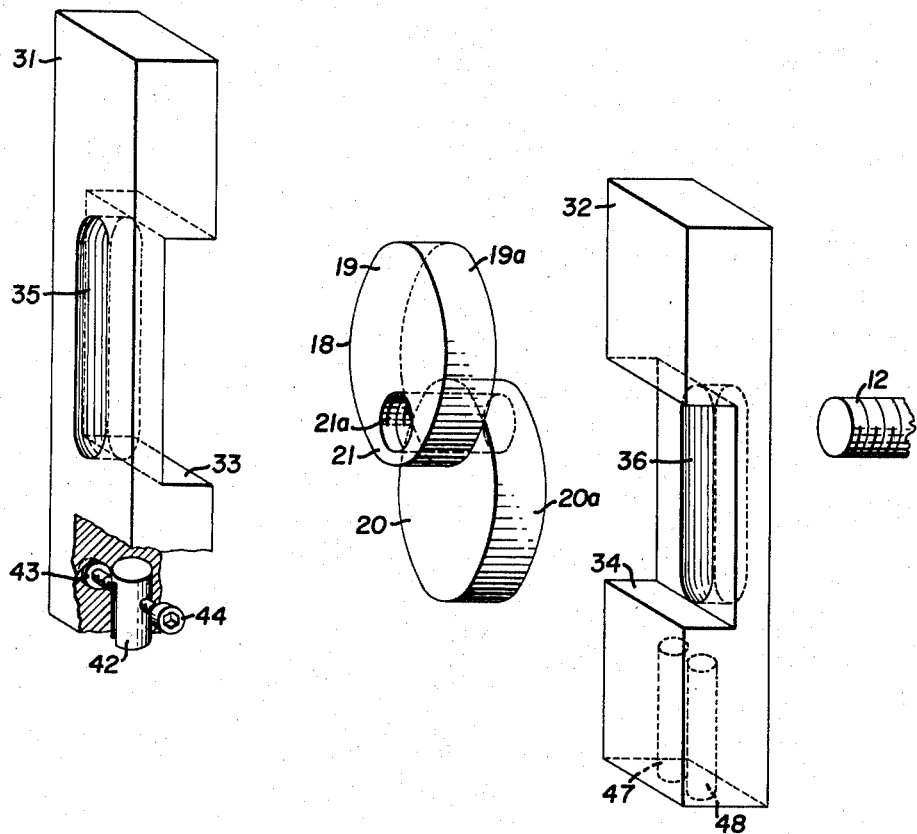
Fig. 3 is an exploded view in perspective of a cam structure and slide assembly as related to a drive shaft for rotation of the cam, and as shown in elevation and vertical section by Figs. 1 and 2.

In the drawings, like parts in each figure are designated by the same numeral. Referring first to Figs. 1 and 2, the numeral 1 designates a housing or casing for the operating elements of the assembly. As shown in Fig. 2 the housing provides longitudinally spaced back and front end portions wherein the back end portion 2 is provided with a recess 3 adapted to receive the neck or shaft bearing housing 4 of a conventional electric drill designated by the numeral 5. At the forward end of the housing is a recess 6 which is indicated in Fig. 2, inwardly of the dotted lines. This recess is cylindrical in form, and adapted to accommodate a cam structure later described. The housing 1 further defines a partition 7 between the recessed portions 3 and 6, which partition is drilled to define a passageway 8 between the recessed portions and coaxially therewith. The numeral 10 designates a cover plate for the recessed portion 6, secured to the sidewall of the recessed portion as by means of cap screws 11.

The numeral 12 designates a threaded shaft extended from the housing neck 4 concentric with the recessed portions 3 and 6 and the passageway 8. The numeral 13 designates a shaft bearing collar extending from the housing neck 4 and rotable with the shaft. The outer face of this collar 13 is in substantially the same plane with that face of the partition 7 which forms the inner end of recessed portion 3. The housing 1 is provided for attachment to the motor housing neck 4 as by means of set screws, of which one is shown in Fig. 2, and designated therein by the numeral 14.

The passageway 8 is provided with an annular ball bearing insert of which the outer raceway 15 is rigidly press-fitted in the passageway 8. The inner raceway 16 is adapted to encircle the shaft freely, and in radially spaced relation thereto. Forwardly of the inner raceway 16 is an annular spacer element 17 which has an internal diameter slightly greater than that of the shaft, and is adapted for engagement at its inner end with the outer end of the inner raceway 16. A cam structure 18, when threaded on the outer end of the shaft 12 forces the collar 17 against the forward end of the raceway 16 and establishes the cam 18, collar 17, raceway 16 and the shaft bearing collar 13 in substantially fixed and friction-tight relation.

The cam structure 18 includes two cam element portions 19 and 20 disposed in superposed, overlapped relation. Each cam element provides a continuous, circular peripheral cam surface. These cam surfaces are designated in the drawings by the numerals 19a and 20a respectively. Although the cam elements may be individual elements, joined in superposed, overlapping relation, as shown, to form an integral cam unit, it is preferred that they be formed from a single piece. In any event the overlapped portions of the cam elements provide a hub such as designated by the numeral 21. In this unit, the circular cam surfaces are equally and uniformly eccentric with reference to the medial point of the hub, which point lies in a straight line connecting the axial centers of each peripheral cam surface, and which point is equidistant from each axial center. The medial point of the hub, of course, is at the intersection of the longitudinal and lateral axes of such hub. The medial point also is the center of rotation for the cam structure 18, and the center of a bore 21a, opening through the hub from face to face, which bore is threaded for engagement with the shaft 12. The medial point, therefore, also lies in the axis of the shaft 12.

The numerals 31 and 32, respectively, each designates one of a pair of matched, reciprocal slides. As most clearly shown in Fig. 3, each slide is provided with a laterally extended groove portion which opens through the side edges of the slide, and which has a depth at least equal to the width of the cam element peripheral surfaces. In the drawings, the respective grooved portions are designated by the numerals 33 and 34. Also as shown, the slides 31 and 32 are of equal length and width, and the grooved portions 33 and 34 are equally spaced from the opposite end edges of the slides. Further, each slide is provided with a slotted portion, designated by the numerals 35 and 36 in the slides 31 and 32 respectively. In each slide, this slotted portion extends along the longitudinal axis of the slide between the side walls of the grooved portion thereof, and opens through the bottom wall of such grooved portion. Preferably, the two slides, as well as the cam elements are produced from hardened, tool steel, and each pair of elements is independently and cooperatively balanced.

As shown particularly by Fig. 1, the side wall of the cylindrical recessed portion 6 of the housing 1 is broached to produce passageways 37 and 38 in diametrically opposite arcuate sections of the wall. Each passageway has a chordial dimension or width substantially equal to the width of the respective slides, with the side wall of each passageway equidistant from a diameter of the recess 6, and parallel thereto. Also as particularly shown by Figs. 1 and 2, the respective slides 31 and 32 have a longitudinal dimension greater than the distance between the outer surface portions of the housing 1, diametrically of the recess 6, and the sidewall thereof. This dimension differential is essentially determined by the cam throw, which is the greatest straight line distance between peripheral cam surfaces 19a and 20a, along a line common to their center points.

The numeral 41, applied in Figs. 2 and 3, designates a bore or recess formed in the lower end of the slide 31 and opening outwardly through the lower end thereof. This recess is disposed concentric with the longitudinal axis of the slide and is adapted to receive a forked, saw blade retainer 42. Set screws 43 and 44 are suitably received in threaded passageways extended through the side edge portions of the slide to engage the retainer tines against a saw blade 45 insertable therebetween. Other means for retaining a saw blade 45 in fixed relation to the slide 31 may be provided.

As indicated in Figs. 2 and 3, the slide 32 is provided with a pair of bore or recess portions 47 and 48 disposed in and opening downwardly from the lower end portion of the slide. These recesses 47 and 48 are disposed in equidistant relation to, and on either side of the longitudinal axis of the slide. Each recess essentially defines a piston cylinder, closed at the upper end and open at the lower end to receive a fixed piston later described.

The numeral 51 as applied in Figs. 1 and 2, designates a substantially flat, rectangular shoe adapted for slideable engagement with a work piece, not shown. The forward end of the shoe 51, as shown in Figs. 1 and 2, is provided with a slotted portion 51a, providing for passage of a saw blade as held by the retainer 42. The shoe 51 is secured to the housing 1, in substantially parallel, spaced relation thereto, and to the axis of shaft 12, as by means of a standard or support 52 disposed in substantially right angular relation to the axis of shaft 12. As shown, the support 52, is a rectangular block fitted into chordial slotted portion 53 of housing 1. The shoe, support and housing each is drilled to receive a pair of cap screws, of which one is shown in Fig. 2. These cap screws are adapted to retain the shoe, support and housing in a rigid, unitary relationship.

As shown by Figs. 1 and 2, a pair of piston elements 61 and 62, each having a head portion such as indicated by the numeral 62a in Fig. 2, are affixed to the upper surface of the shoe 51, as by means of cap screws or bolts 63 and 64. These piston elements are disposed forwardly of the support 52, and so that each piston element is in coaxial relation to one of the bores 47 and 48 respectively, and adapted to be received thereby. The length of each piston element is proportioned to be slightly greater than the distance between the shoe and casing, and so as to permit a part of its head to remain within its corresponding bore at the full upper limit of the throw of the cam portion 19, substantially as shown in Fig. 2. Each piston is further characterized by an internal bore, designated in Fig. 2 by the numeral 62b. These bores open through the piston heads at the upper end and angular downward and inward toward the shoe slotted portion 51a at the lower end.

A saw blade guide is provided by means of rotatable discs 65 and 66. These discs are loosely supported for rotation in a slotted portion at the forward end of a support pin 67, by means of a small concentric shaft designated by the numeral 68. The support pin 67 is fitted and secured in a passageway, not shown, which extends through the support block 52 in axial alignment with the center line of the shoe slotted portion 51a. The numeral 69 designates a cover or guard adapted to accommodate the slides 31 and 32 at the upper limits of their reciprocal movement in the guideways 37 and 38.

In operation of the apparatus as described, rotation of the shaft 12 rotates the cam 18 about the shaft. Rotation of the cam induces reciprocal movement of the slides 31 and 32 at right angles to the axis of the shaft and cam. As shown in the drawings, the slides are in slideable surface contact over their inner surfaces, and are maintained in such relationship by means of the cover plate 10 which engages the outer surface of the slide 31 in reciprocally slideable surface contact. The outer surface of the cam 32 slideably engages the bottom surface of the recess portion 6. The balanced relationships of the respective cam elements 19 and 20, and the slides 31 and 32 avoid any undue vibration when the saw blade 35 is either in or out of engagement with a work piece. The recess 6 is intended to contain a lubrication compound such as a cup grease or the like, which remains semi-solid under operating conditions.

Reciprocal movement of the slide member 32 produces alternate insertion and partial withdrawal of the heads of the fixed pistons 61 and 62, into and from the recesses 47 and 48. This produces an alternate inspiration of air into and explusion thereof from the cylinders or recesses 47 and 48. By reason of the direction of the lower end of the bores 61a and 62a, each full stroke of the slide 32 produces a discharge of twin streams of air toward the cutting edge of the blade 45 to clear sawdust from the surface of the work piece.

The invention claimed is:

A jig saw device which comprises a housing, a rotatable shaft extended axially into said housing, a cam unit mounted on said shaft for rotation therewith, within said housing, said cam unit essentially consisting of two overlapped and superposed circular elements of equal diameter, each affording a continuous peripheral cam surface, said unit disposed in perpendicular relation to the axis of said shaft, with said axis extending through a point in a line common to the centers of each element and equidistant therefrom, a pair of reciprocal slide elements, of substantially balanced weights and equal dimensions, each of said slide elements defining a grooved portion extending laterally of one surface thereof, equidistant from opposite ends of said slide and of a width substantially equal to the diameter of said cam elements, said groove portion adapted to receive one of said cam elements, each of said slide elements further defining a slotted portion longitudinally thereof which opens through the bottom wall of said grooved portion laterally and midway between the ends thereof, said slotted portion adapted freely to receive said rotatable shaft, said slide elements disposed in aligned surface to surface relation on opposite sides of said cam unit and in parallel relation to a line extended through the centers of the cam elements of said unit, with each said cam elements received in one of the respective grooved portions of said slide elements, a guide way for said slide elements defined diametrically of said housing and opening therethrough, a saw blade receptacle in one outer end portion of one of said slide elements, and in longitudinal, axially alignment therewith, a pair of laterally spaced, parallel recess portions defined in the corresponding outer end portion of the other slide element, a shoe plate supported by and rigidly secured to said housing in radially spaced relation thereto and in right angular relation to said slide elements, a pair of hollow piston tubes mounted on said shoe plate in right angular relation thereto and each in coaxial relation to one of said recess portions in the ends of said other slide element, said piston tubes adapted to be received in reciprocal relation within said recess portions; and an air jet tube opening from the interior of each hollow piston tube through the side wall thereof toward the axis of said saw blade receptacle.

References Cited in the file of this patent

UNITED STATES PATENTS

| | | |
|---|---|---|
| 209,334 | Dunlap | Oct. 29, 1878 |
| 598,253 | McKee | Feb. 1, 1898 |
| 663,704 | Schnick | Dec. 11, 1900 |
| 1,648,008 | Selby et al. | Nov. 8, 1927 |
| 2,282,728 | Kern | May 12, 1942 |
| 2,345,383 | Curtis | Mar. 28, 1944 |
| 2,627,882 | Kleinsmith | Feb. 10, 1953 |
| 2,746,493 | Babcock | May 22, 1956 |